US012423346B2

(12) United States Patent
Colton et al.

(10) Patent No.: US 12,423,346 B2
(45) Date of Patent: Sep. 23, 2025

(54) USE OF MISMATCHED QUERY FINGERPRINT AS BASIS TO VALIDATE MEDIA IDENTIFICATION (71) Applicant: Gracenote, Inc., Emeryville, CA (US)

(72) Inventors: John Colton, Emeryville, CA (US); Damon Fasching, Emeryville, CA (US); Suresh Jeyachandran, Emeryville, CA (US); Dong-In Lee, Emeryville, CA (US); Kathyrene Villariba, Emeryville, CA (US)

(73) Assignee: GRACENOTE, INC., New York, NY (US)

( * ) Notice: Subject to any disclaimer, the term of this patent is extended or adjusted under 35 U.S.C. 154(b) by 82 days.

(21) Appl. No.: 17/814,294

(22) Filed: Jul. 22, 2022

(65) Prior Publication Data
US 2024/0028637 A1 Jan. 25, 2024

(51) Int. Cl.
G06F 16/48 (2019.01)
G06F 3/16 (2006.01)
G06F 16/432 (2019.01)
G06F 16/438 (2019.01)
G06F 16/483 (2019.01)

(52) U.S. Cl.
CPC ......... G06F 16/483 (2019.01); G06F 3/165 (2013.01); G06F 16/432 (2019.01); G06F 16/438 (2019.01)

(58) Field of Classification Search
CPC .... G06F 16/432; G06F 16/438; G06F 16/483; G06F 3/165
See application file for complete search history.

(56) References Cited

U.S. PATENT DOCUMENTS

| 8,768,003 | B2 | 7/2014 | McMillan | |
| 9,153,239 | B1* | 10/2015 | Postelnicu | G10L 25/18 |
| 10,275,578 | B2* | 4/2019 | Bilobrov | G06F 21/10 |
| 10,805,673 | B2* | 10/2020 | Lee | H04N 21/2353 |
| 2004/0249859 | A1* | 12/2004 | Ward | G11B 27/32 |
| 2011/0173185 | A1* | 7/2011 | Vogel | G06F 16/634 |
| | | | | 707/E17.014 |
| 2013/0318114 | A1* | 11/2013 | Emerson, III | G10L 19/018 |
| | | | | 707/758 |
| 2019/0108187 | A1* | 4/2019 | Coover | G06F 16/683 |

* cited by examiner

Primary Examiner — Brittany N Allen
(74) Attorney, Agent, or Firm — MCDONNELL BOEHNEN HULBERT & BERGHOFF LLP (57) ABSTRACT A method for controlling presentation of metadata regarding media. A system could generate query fingerprints representing media content being presented, the media content having been identified as being a first media-content item. The system could further detect a threshold mismatch comprising at least one of the query fingerprints not matching any of first reference fingerprints known to represent the first media-content item. In response, the system could engage in new media identification, establishing that the media content is a second media-content item, and could obtain both second reference fingerprints known to represent the second media-content item and metadata regarding the second media-content item. Further, the system could validate the new identification as a condition precedent to presenting the obtained metadata, the validating including comparing with the obtained second digital reference fingerprints the at least one digital query fingerprint that did not match any of the first digital reference fingerprints.

18 Claims, 4 Drawing Sheets

USE OF MISMATCHED QUERY FINGERPRINT AS BASIS TO VALIDATE MEDIA IDENTIFICATION

BACKGROUND

The present disclosure relates to media identification, such as identifying a song, video, and/or other media-content item that is currently being presented and responsively providing associated identification information such as title, artist, and/or other metadata regarding the identified media-content item. This process could apply to facilitate identification of media being presented by an end-user media device and/or to facilitate identification of media being presented by a streaming media server to one or more end-user devices, among other possibilities.

SUMMARY

An example media-identification process could involve fingerprint-based automatic content recognition (ACR), comparing digital query fingerprint data representing of the media being presented with digital reference fingerprint data representing various known media-content items, and, upon finding that the query fingerprint data matches reference fingerprint data representing a particular media-content item, concluding that the media being presented is that particular media-content item.

For instance, a computing system could be provisioned in advance with a reference database containing digital reference fingerprints representing segments of known media-content items and containing metadata respectively per known media-content item, and the computing system could obtain digital query fingerprints representing the media being presented and could compare those query fingerprints with the reference fingerprints in an effort to find a fingerprint match. Upon finding with sufficient certainty that one or more such query fingerprints matches one or more reference fingerprints representing a given known media-content item, the computing system could conclude that the media being presented is that given media-content item. And responsive to identifying the media-content item, the computing system could then obtain from the reference database metadata regarding the identified media-content item and provide that metadata for ultimate receipt by an end-user consumer of the media content being presented.

Without limitation, a more specific example of this process could involve a client-server implementation where a media client, such as an end-user media player or associated device, interacts with a network/cloud based fingerprint-matching server. While such a media client is presenting a linear sequence of media (e.g., while the media client is itself presenting the media or is processing the media for presentation by an associated device), the media client could generate digital query fingerprints representing segments of the media and could transmit those generated query fingerprints to the server. As the server receives these query fingerprints, the server could then compare the query fingerprints with digital reference fingerprints representing segments of known media-content items. And upon finding with sufficient certainty that one or more such query fingerprints matches one or more corresponding reference fingerprints representing a known media-content item, the server could conclude that the media client is presenting that known media-content item. Responsive to identifying the media-content item being presented by the media client, the server could then obtain from the reference database and send to the media client a set of metadata regarding the identified media-content item, and the media client could display or otherwise present that metadata for receipt by an end-user consumer of the media being presented.

Further, also without limitation, another example of this process could be a more server-centric implementation, involving a server (e.g., a server platform such as one or more servers) that streams or otherwise delivers media to end-user devices for presentation. Such a server could function as an intermediary or distributor of media provided by one or more content providers. For instance, the server could receive a live broadcast of media on a radio station or TV channel and stream the received media to end-user media players for playout. The server or another such device could thus be considered to be "presenting" the media by streaming or otherwise providing the media for presentation by one or more other devices.

As this server presents the media, the server could generate digital query fingerprints representing segments of the media being presented and could compare the query fingerprints with digital reference fingerprints representing segments of known media-content items. Upon finding with sufficient certainty that one or more such query fingerprints matches one or more corresponding reference fingerprints representing a known media-content item, the server could conclude that it is presenting that known media-content item. And responsive to so identifying the media-content item being presented, the server could then obtain from the reference database a set of metadata regarding the identified media-content items and could send the metadata along with the media being streamed, or through other means, to the end-user devices, so that the end-user devices could receive and present the metadata along with the media.

In these or other such processes, when the computing system identifies the media-content item being presented, the computing system could additionally obtain from the reference database a set of reference fingerprints representing the identified media-content item. And the system could then continue to obtain query fingerprints representing the media being presented and could compare those query fingerprints with the reference fingerprints representing the identified media-content item, in order to evaluate whether the media being presented continues to be the identified media-content item.

This evaluation could help reduce the likelihood of continuing to present the metadata regarding the identified media-content item once that media-content item is no longer being presented. For instance, responsive to detecting at least a threshold mismatch between the ongoing query fingerprints representing the media being presented and the reference fingerprints representing the identified media-content item, the system could discontinue providing or presenting the metadata regarding the identified media-content item or could provide a control signal to cause presentation of the metadata to stop. Further, this evaluation could help trigger new media-content identification. For instance, upon detecting the threshold mismatch, the computing system could then repeat the process noted above to newly identify the media being presented, and the process could then repeat.

Applying this in the example client-server implementation described above, for instance, when the media client receives from the server the metadata regarding the identified media-content item being presented, the media client could also receive from the sever a set of reference fingerprints representing the identified media-content item. Further, the media client could continue to generate query fingerprints representing the media being presented, and the media client could compare those query fingerprints with the received reference fingerprints representing the identified media-content item. Once the media client thereby finds a threshold fingerprint mismatch, such as two or more of the query fingerprints in sequence not matching any of the provided reference fingerprints, the media client could then responsively discontinue presenting the metadata regarding the identified media-content item. Further, in response to finding the threshold fingerprint mismatch, the media client could generate and provide to the server one or more query fingerprints representing the media being presented, to facilitate a new media identification in the manner discussed above.

Likewise, applying this in the more server-centric implementation described above, once the server has identified the media-content item being presented, the server could also obtain from the reference database a set of the reference fingerprints representing that identified media-content item, and the server could then continue to generate query fingerprints representing the media being presented and could compare those query fingerprints with the obtained reference fingerprints representing the identified media-content item. Once the server thereby finds a threshold fingerprint mismatch, the server could then responsively discontinue providing the metadata regarding the identified media-content item, and/or may provide a control signal that causes one or more end-user devices to stop presenting that metadata. Further, in response to finding the threshold fingerprint mismatch, the server could then generate one or more query fingerprints representing the media content being presented and could newly engage in media identification in the manner discussed above.

In a representative implementation, the computing system could make use of different resolutions (e.g., different granularities) of fingerprints for purposes of identifying the media-content item than for purposes of evaluating whether the identified media-content item continues to be presented.

Depending on the fingerprinting technology used, there could be at least a high-resolution form of digital fingerprint and a low-resolution form of fingerprint. A high-resolution fingerprint could be more granular and more representative of the media content than a low-resolution fingerprint, such as by representing a given segment of the media content with a greater number of bits than the low-resolution fingerprint and/or being generated with a fingerprinting algorithm that otherwise better represents the media content than the algorithm used to generate a low-resolution fingerprint.

With at least high and low resolution forms of fingerprints, the system may use high-resolution fingerprints for purposes of identifying a media-content item being presented and may then use low-resolution fingerprints for purposes of evaluating whether the identified media-content item continues to be presented. For instance, for identifying the media-content item being presented, the system may obtain high-resolution query fingerprints and compare those high-resolution query fingerprints with high-resolution reference fingerprints representing various known media-content items—which may facilitate relatively quick and accurate media-content identification. Then for purposes of evaluating whether the identified media-content item continues to be presented, the system may obtain low-resolution query fingerprints and compare those low-resolution query fingerprints with low-resolution reference fingerprints representing the identified media-content item—which may help to conserve processing power and other issues with ongoing fingerprint matching.

Thus, upon identifying the media-content item based on high-resolution fingerprint matching, the system may then obtain low-resolution reference fingerprints of the identified media-content item, the system generate low-resolution query fingerprints of the media being presented, and the system may conduct low-resolution fingerprint matching, comparing the low-resolution query fingerprints with the low-resolution reference fingerprints until the system finds a threshold mismatch suggesting that the identified media-content item is no longer being presented. And in response to detecting a threshold mismatch, the system may then newly engage in the media-content identification process again based on high-resolution fingerprint matching.

One technical problem with the above processes is that the successful and correct fingerprint matching conducted in order to identify the media-content item being presented may not always correctly identify the media-content item being presented. For instance, at the moment the system generates the query fingerprints (e.g., high-resolution query fingerprints) that will be compared with the reference fingerprints (e.g., high-resolution reference fingerprints) in an effort to identify the media-content item being presented, the media being presented may happen to be merely a sample of a media-content item (e.g., a promo clip of the media-content item, or another media-content items that samples the media-content item) rather than the media-content items itself. Yet the system may correctly find with high certainty a match between the query fingerprint(s) (e.g., high-resolution query fingerprints) and the reference fingerprint(s) (e.g., high-resolution reference fingerprints) representing the media-content item and may therefore proceed as described above, providing metadata regarding that media-content item and obtaining reference fingerprints (e.g., low-resolution reference fingerprints) representing the "identified" media-content item to facilitate evaluating whether presentation of that media-content item continues. Unfortunately in this situation, the provided metadata would be incorrect, as the "identified" media-content item is not actually the media-content item being presented.

One way to help address this problem is to validate the system's identification of the media-content item, as a condition precedent for presenting the metadata regarding that media-content item. For instance, after obtaining the reference fingerprints (e.g., low-resolution fingerprints) representing the identified media-content item, the system could then proceed as noted above to generate query fingerprints (e.g., low-resolution query fingerprints) of the media being presented and to compare those query fingerprints with the reference fingerprints representing the identified media-content item, and the system could require that it find at least a threshold number (e.g., 2 or more) of fingerprint matches as a condition precedent for the system then presenting the metadata regarding that media-content item. If the system does not find at least the threshold number of fingerprint matches, then the system could conclude that the media being presented is not actually the identified media-content item and could responsively restart the media identification process as discussed above. Whereas, if the system finds the threshold number of fingerprint matches, then the system could responsively present the associated metadata.

Applying this in the client-server implementation described above, for instance, once the server has identified the media-content item being presented (e.g., using high-resolution fingerprint matching) and the media client receives from the server the metadata regarding the identified media-content item and the reference fingerprints (e.g., low-resolution reference fingerprints) representing the identified media-content item, it is known for the media client to then generate query fingerprints (e.g., low-resolution query fingerprints) representing the media being presented and to compare those newly generated query fingerprints with the received reference fingerprints representing the identified media-content item. Further, it is known for the media client to require that it find at least a threshold number of fingerprint matches as a condition precedent for the media client then starting to present the received metadata. If the media client does not thereby find at least the threshold number of fingerprint matches, and particularly if the media client finds a threshold number fingerprint mismatches, then the media client could conclude that the media being presented is not the identified media-content item, and so the media client could responsively not present the received metadata. Whereas, if the media client thereby finds at least the threshold number of fingerprint matches, then the media client could then responsively start presenting the metadata.

Likewise, applying this in the more server-centric implementation described above, once the server has identified the media content item being presented (e.g., using high-resolution fingerprint matching), the server could then generate query fingerprints (e.g., low-resolution query fingerprints) representing the media being presented and could compare those newly generated query fingerprints with reference fingerprints (e.g., low-resolution reference fingerprints) representing the identified media-content item. And the server could require that it find at least a threshold number of fingerprint matches as a condition precedent for the server then providing metadata regarding the identified media-content item. If the server does not thereby find at least the threshold number of fingerprint matches, and particularly if the server finds a threshold number fingerprint mismatches, then the server could conclude that the media being presented is not the identified media-content item, and so the server could responsively not provide the metadata regarding that media-content item. Whereas, if the server thereby finds at least the threshold number of fingerprint matches, then the server could responsively provide the metadata.

Unfortunately, however, this validation process could itself create another technical issue. Namely, the validation process could delay the presentation of the metadata regarding the identified media-content item, as the system would first need to generate query fingerprints (e.g., low-resolution query fingerprints) to compare with the reference fingerprints (e.g., low-resolution reference fingerprints) representing the identified media-content item. Depending how long of a segment of media each fingerprint represents, this delay may be significant and may pose a user experience problem. For instance, if each fingerprint represents 3 seconds of media, and if the validation process requires generating two such query fingerprints and finding that those two query fingerprints match the reference fingerprints representing the identified media-content item as a condition precedent to then providing/presenting the associated metadata, then the validation process may take at least 6 seconds and may therefore delay any presentation of the associated metadata by at least 6 seconds as well.

The present disclosure provides a technical solution that may help to address this issue. In accordance with the disclosure, once the system has identified the media-content item being presented, the system could then use at least one of its most recently mismatched query fingerprints as a basis to perform the validation—namely, the system could use as a query fingerprint in the validation process at least one query fingerprint that contributed to the finding of threshold mismatch that triggered identifying the media-content item.

In particular, this process could apply where (i) the system had generated query fingerprints (e.g., low-resolution query fingerprints) and compared those query fingerprints with reference fingerprints (e.g., low-resolution reference fingerprints) representing an identified media-content item, (ii) the system had found that a most recent one or more such query fingerprints did not match the reference fingerprints representing the identified media-content item, and (iii) the system had therefore newly engaged in media identification (e.g., using high-resolution fingerprints) and had thus newly identified a media-content item being presented. In that context, the system could then advantageously make use of at least one such non-matching query fingerprint (e.g., low-resolution query fingerprint) as a point of comparison with the reference fingerprints (e.g., low-resolution reference fingerprints) representing the newly identified media-content item, in an effort to validate the new media identification, as a condition precedent to then presenting metadata regarding the newly identified media-content item.

For instance, if the system had found two preceding query fingerprints (e.g., low-resolution query fingerprints) to be mismatches, representing a possible total of 6 seconds of media in the above example, then the system could match each of those preceding query fingerprints (e.g., low-resolution query fingerprints) against the reference fingerprints (e.g., low-resolution reference fingerprints) representing the newly identified media-content item, without a need to wait for 6 seconds to finish generating those two new query fingerprints in order to be able to match them against the received reference fingerprints. If the system finds that those two preceding query fingerprints match the reference fingerprints, then the system could conclude that the media-content item being presented is in fact the newly identified media-content item and could responsively proceed to present the associated metadata. Whereas, if the system finds that at least one of those two preceding query fingerprints does not match the reference fingerprints, then the system could conclude that the new media-content identification is incorrect, and the system could responsively restart the media-identification process as discussed above.

The disclosed process may help to improve both speed and accuracy of presenting media-content identification.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

This description will now focus by way of example on a client-server implementation where the media at issue is audio media, where the media-content items are songs, and where the media client is configured to receive and play out an audio feed such as a broadcast radio station feed, a satellite radio feed, a streaming media audio feed, or an audio feed from an optical disc or other storage medium, among other possibilities. It should be understood, however, that the disclosed principles could apply in other contexts as well, such as with respect to other types of media and media-content items, with respect to other types of media clients including possibly media clients that present media on one or more associated devices, and in arrangements other than the client-server implementation.

Referring to the drawings, as noted above, FIG. 1 is a simplified block diagram of an example media client 102. The example media client 102 could be any device configured to receive and play an audio as noted above. Examples of such a device could include a television, a radio, a mobile phone, a personal computer, a gaming device, a sound speaker, earbuds, a headset, an augmented or virtual reality device, or an audio/video receiver, among other possibilities. Without limitation, for instance, the media client 102 could be an audio player integrated in an automotive head unit of a vehicle such as a car, bus, or truck, among other possibilities, and the media client 102 could be configured to play audio through one or more in-vehicle sound speakers to be heard by one or more people in the vehicle and to present song metadata on an in-vehicle display screen for viewing by one or more people in the vehicle.

Figure 1:
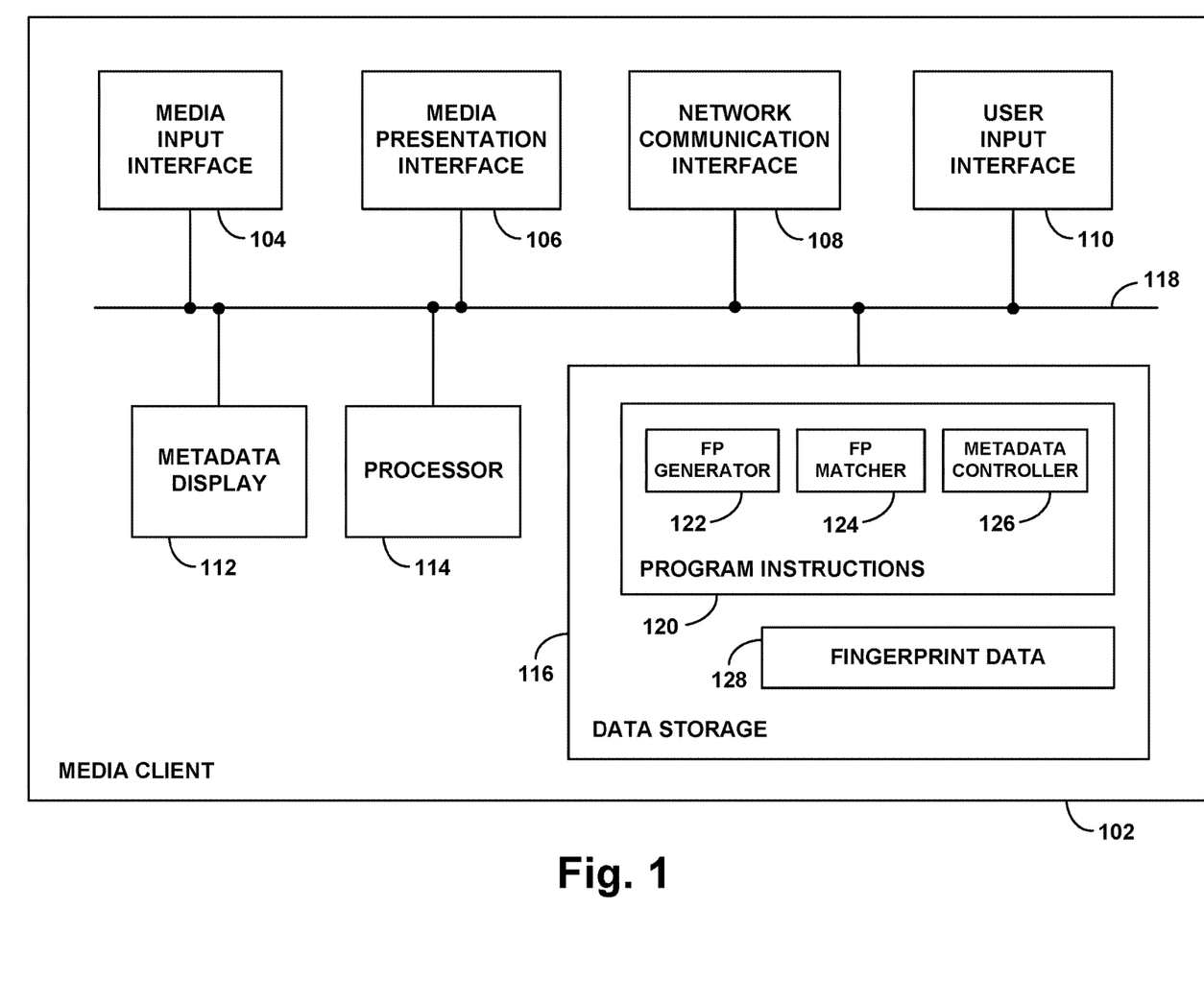
FIG. 1 is a simplified block diagram of an example media client.

FIG. 1 shows some of the components that could be included in the example media client 102 to facilitate carrying out various disclosed operations. Although these components are shown as parts of the example media client 102, some of these components could alternatively be components of an associated system, such as a vehicle or other system in which the media client 120 is provided for instance, with the media client 102 being configured to make use of those components.

As shown in FIG. 1, the example media client 102 includes a media-input interface 104, a media-presentation interface 106, a network communication interface 108, a user-input interface 110, a metadata display 112, a processor 114, and non-transitory data storage 116, all of which could be integrated or communicatively linked together to various extents and in various ways, such as by a system bus, network, or other connection mechanism 118.

The media-input interface 104 could comprise any interface from or through which the media client 102 could receive an analog or digital audio feed for playout. Examples of such interfaces include, without limitation, a radio and/or satellite radio tuner with associated antenna for selectively tuning to and receiving a broadcast audio feed, a connection with local media storage through which to receive stored audio, an auxiliary connection mechanism such as a universal serial port or wireless link through which to connect with and receive audio from an auxiliary audio player, and/or an optical disc player for playing audio encoded on an optical disc such as a compact disc. Such an interface may also include circuitry and/or a programmed processor for converting between analog and digital formats and for otherwise processing audio being received.

The media-presentation interface 106 could in turn comprise any interface through which the media client 102 could play out and thus present audio. For instance, the media-presentation interface 106 could include one or more sound speakers or other audio output means. Further, the media presentation interface 106 may include circuitry, a programmed processor, and/or other logic for rendering received audio for presentation. When the media client is receiving an encoded digital audio feed, for instance, this logic could operate to decode, transcode, convert to analog, and/or otherwise translate the audio stream into a format suitable for playout.

The network communication interface 108 could comprise any communication mechanism through which the media client 102 could engage in communication with an example network/cloud based fingerprint-matching server. For instance, the network-communication interface 108 could comprise a cellular wireless communication interface with associated antenna structure, and/or a wired or wireless communication interface for connecting with an auxiliary wireless communication interface such as a mobile hotspot, through which to engage in such network communication. Further, the network communication interface 108 could include associated circuitry, a programmed processor, and/or other logic for engaging in such communications, such as logic defining applicable protocol stacks.

The user-input interface 110 could comprise one or more buttons, knobs, voice-input mechanisms, touch-sensitive displays, or other user-input mechanisms for receiving user input to control operation of the media client 102. For instance, the user-input interface 110 could include knobs or other mechanisms that a user could use to select a desired audio feed, such as a desired audio source, a desired radio station, and/or other audio. And the user-input interface 110 could include one or more knobs or other mechanisms that a user could use to control playback (e.g., play, pause, stop, forward, reverse, etc.) and to control output volume, among other possibilities.

The metadata display 112 could comprise any display screen or other display mechanism for presenting song metadata and possibly other useful information. This display screen could also be a touch-sensitive display that could operate as the user-input interface 110. In an alternative embodiment, the media client could be equipped to preset metadata in another manner, such as audibly and/or on a second-screen device, among other possibilities.

The processor 114 could comprise one or more processors, such as one or more general-purpose processors (e.g., microprocessors) and/or one or more special-purpose processors (e.g., digital signal processors or application specific integrated circuits) and could be integrated in whole or in part with one or more other of the components. Further, the non-transitory data storage 116 could comprise one or more volatile and/or non-volatile storage components (in any case non-transitory), such as optical, magnetic, flash, and/or organic storage, among other possibilities, and could be integrated in whole or in part with the processor 114.

As further shown, the non-transitory data storage 116 could hold program instructions 120, which could be executable by the processor 114 to carry out various media client operations described herein. Without limitation, as shown, the program instructions 120 could define (i) a fingerprint-generator module 122, which could be executable to generate digital query fingerprints representing audio being presented by the media client 102 (e.g., audio being processed for presentation), (ii) a fingerprint-matching module 124, which could be executable to compare the generated digital query fingerprints with digital reference fingerprints representing an identified song, and (iii) a metadata-control module 126, which could be executable to control presentation of song metadata contingent on validation as described herein. Further, the non-transitory data storage 116 could hold fingerprint data 128 such as query and reference fingerprints.

Figure 2:
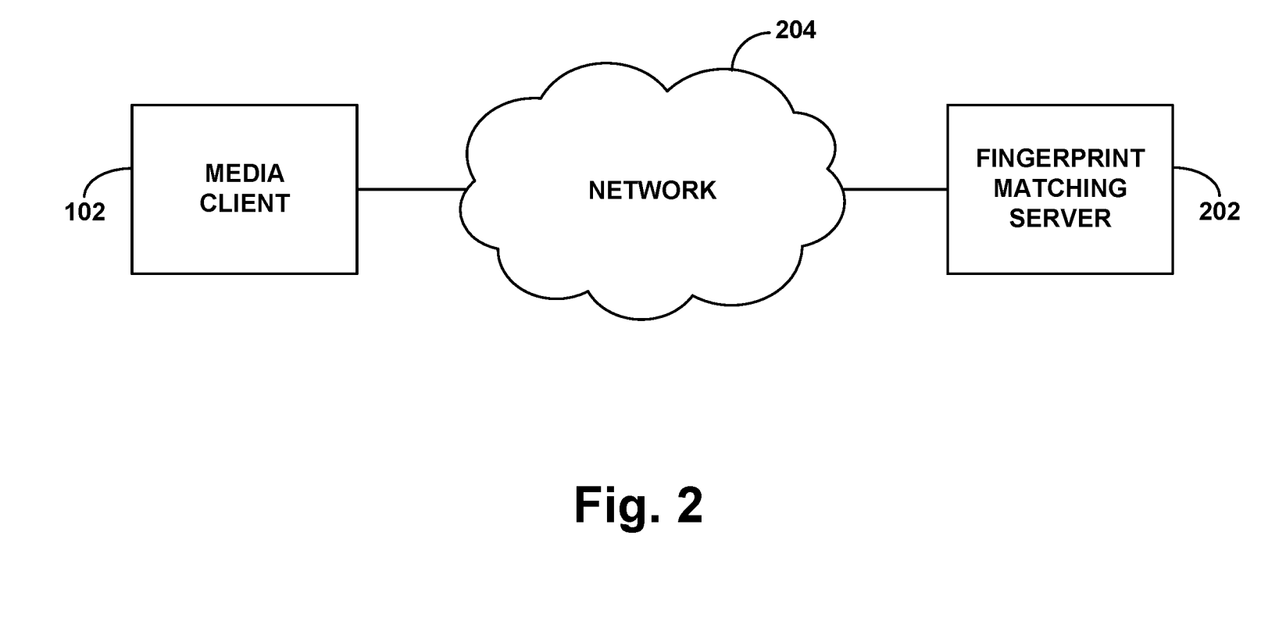
FIG. 2 is a simplified block diagram of an example system including a media client and a server.

FIG. 2 is next a simplified block diagram of an example system that includes the example media client 102 and an example fingerprint-matching server 202, in communication with each other through a communication network 204 such as the internet for instance. In practice, the media client 102 (or an associated communication device) and the fingerprint-matching server 202 (or an associated device) could each have a respective address on network 204, such as a respective Internet Protocol (IP) address for instance, and could be configured to engage in network communication with each other over the network 204.

Through this communication, for instance, the media client 102 could send to the server 202 query fingerprints representing audio being presented by the media client 102, and the server 202 could send to the media client 102 information about a song that the server 202 concludes the media client 102 is presenting, such as metadata regarding that song and reference fingerprints representing the song.

Figure 3:
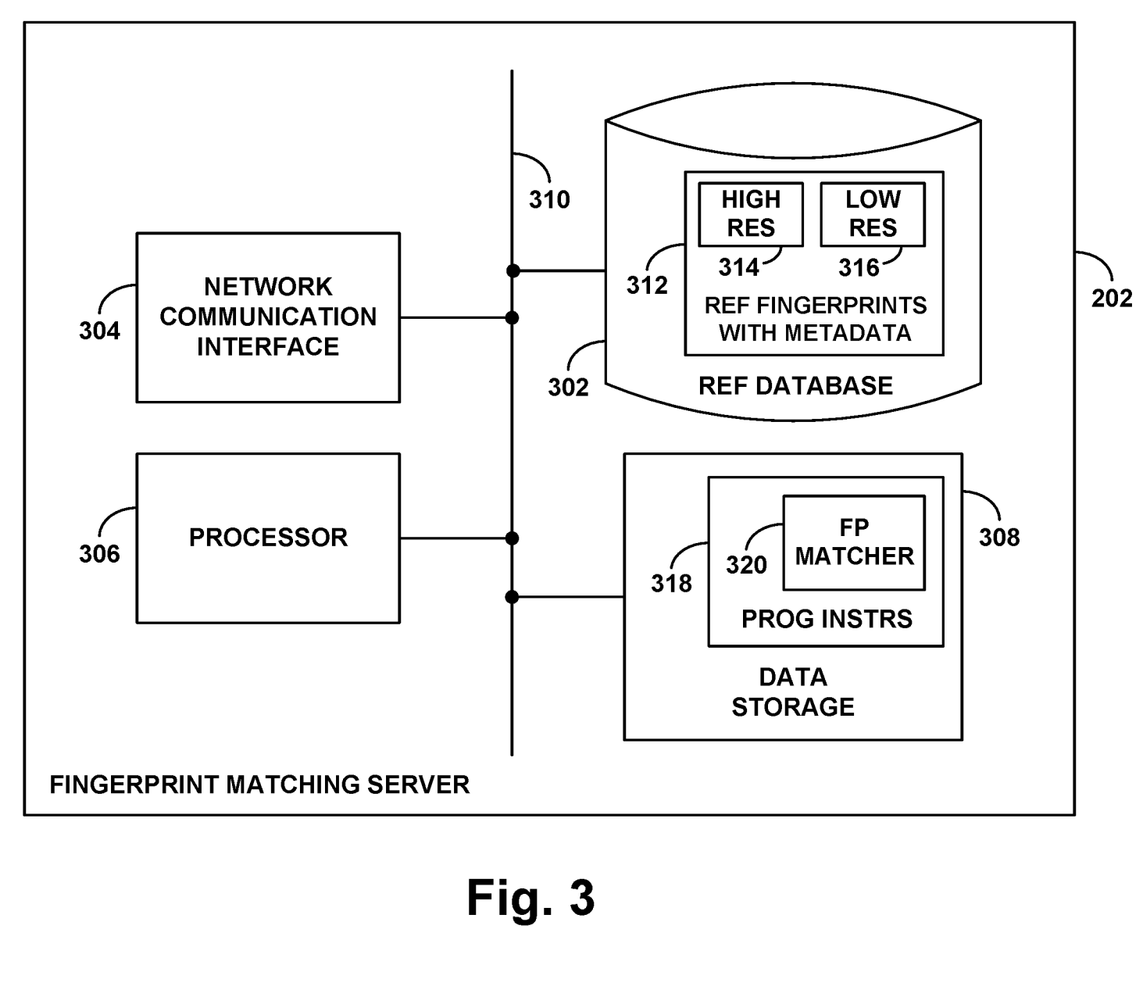
FIG. 3 is a simplified block diagram of an example server.

FIG. 3 is next a simplified block diagram of the example fingerprint-matching server 202, showing some of the components that could be included in the server 202 to facilitate carrying out various disclosed operations. Some or all of these components could be external to and accessible by the server 202, and/or the server 202 could comprise a platform made up of multiple servers and/or other components.

As shown in FIG. 3, the example fingerprint-matching server 202 could include or have access to a reference database 302. Further, the server 202 could include a network communication interface 304, a processor 306, and non-transitory data storage 308, all of which could be integrated or communicatively linked together to various extents and in various ways, such as by a system bus, network, or other connection mechanism 310.

The reference database 302 could hold pre-established digital reference fingerprints 312 respectively representing the audio of many known songs, along with associated metadata per song. Namely, the reference database 302 could correlate each stored reference fingerprint with an identifier of the song whose segment the reference fingerprint represents, and the reference database 302 could further correlate each song identifier with a set of metadata regarding that song, such as the title, artist, album, duration, date, and/or other information about the song. This reference data could be established in any manner now known or later developed.

Further, as shown, the reference database 302 could hold both high-resolution digital reference fingerprints 314 and low-resolution digital reference fingerprints 316, possibly having separately accessible data sources for each. Thus, the reference database 302 could hold, per song, both high-resolution digital reference fingerprints 314 representing segments of the song and low-reference digital reference fingerprints 316 representing segments of the song. With this arrangement, in line with the discussion above, the server 202 could use the high-resolution reference fingerprints 314 for fingerprint-matching to identify a song being presented by the media client 102, and upon identifying that song, the server 202 could then obtain from the reference database 302, and provide to the media client 102, both a set of the low-resolution fingerprints 316 representing that identified song and the metadata regarding the identified song.

The network communication interface 304 could comprise any wired and/or wireless interface for supporting network communication such as communication with the media client 102 over network 204. For instance, the network communication interface 304 could comprise an Ethernet communication interface along with associated program logic, among other possibilities.

The processor 306 could in turn comprise one or more processors, such as one or more general-purpose processors (e.g., microprocessors) and/or one or more special-purpose processors (e.g., digital signal processors or application specific integrated circuits) and could be integrated in whole or in part with one or more other of the components. Further, the non-transitory data storage 308 could comprise one or more volatile and/or non-volatile storage components (in any case non-transitory), such as optical, magnetic, flash, and/or organic storage, among other possibilities, and could be integrated in whole or in part with the processor 306.

As further shown, the non-transitory data storage 308 could hold program instructions 312, which could be executable by the processor 306 to carry out various server operations described herein. Without limitation, as shown, the program instructions 318 could define a fingerprint-matching module 320, which could be executable to compare digital query fingerprints with digital reference fingerprints in order to identify a song being presented by the media client 102.

Digital audio fingerprints (also known as digital acoustic fingerprints) are well understood to represent or summarize certain attributes of audio content rather than being a digitized instance of the audio content itself. Digital audio fingerprinting could involve application of a fingerprinting algorithm on a per-time-segment basis, generating a bit sequence that uniquely represents select attributes of the audio segment, such that the same audio segment subject to the same algorithm should produce the same audio fingerprint, but preferably such that the underlying audio could not be reconstructed from the fingerprint.

Without limitation, an example digital audio fingerprinting process could involve establishing a digital audio fingerprint respectively for each of various approximately 3-second segments of the audio, with each segment being divided into a sequence of sub-segments, and with the audio fingerprint per segment specifying or otherwise representing on a per-sub-segment basis which of various audio frequencies have threshold high energy in the sub-segment.

For instance, the process could involve dividing the audio over time into sub-segments each being on the order of 8, 9, 10, or 11 milliseconds long, and grouping those sub-segments in segments on the order of 3 seconds long. (For instance, if each sub-segment is 10 milliseconds long, each segment could be a respective group of 300 sub-segments.) And for each sub-segment in a segment, the process could involve dividing a range of applicable audio frequency (e.g., in Hertz) into sub-carriers or sub-bands, such as a range of 32 or 64 frequency bands, and producing a sub-fingerprint as a corresponding 32 or 64 bit sequence, with each bit representing whether or not the audio in the sub-time segment has at least predefined threshold high energy at a respective frequency band. The process could then involve generating as a fingerprint for the 3-second audio segment a combination (e.g., array) of these 32 or 64 bit sequences for the encompassed sub-time segments.

If query and reference fingerprints are both generated using this fingerprinting process, query fingerprints can be compared with reference fingerprints in an effort to find a match. For instance, to compare a query fingerprint with a reference fingerprint, a computing system could compare respective sub-fingerprints to see if their bits match. In particular, the computing system could compare a given sub-fingerprint of the query fingerprint with a given sub-fingerprint of the reference fingerprint by taking the exclusive-OR (XOR) sum of sub-fingerprints, counting the bits in the XOR sum, and concluding that the sub-fingerprints match if the count of matching bits is at least as high as a predefined threshold deemed to represent a match with high enough confidence. And the computing system could then count how many of the sub-fingerprints of the query fingerprint matched respective sub-fingerprints of the reference fingerprint. Further, given the non-deterministic starting point of each fingerprint time segment, the computing system could perform this matching iteratively for various index positions of the query fingerprint in relation to the reference fingerprint, in an effort to find a most optimal match position.

As noted above, such fingerprints could be created with various resolutions. By way of example, high-resolution audio fingerprints could be 64-bit fingerprints (e.g., granularly representing 64 different frequency sub-bands of audio), and low-resolution audio fingerprints could be 32-bit fingerprints (e.g., less granularly representing just 32 different sub-bands of audio). As another example, high-resolution audio fingerprints could include all of the sub-fingerprints for the sub-segments of the represented audio segment, and low-resolution audio fingerprints could include less than all of those sub-fingerprints, such as just every fourth or eighth sub-fingerprint, i.e., a sub-fingerprint of every fourth or eighth sub-segment (in which case, the matching process may need to involve comparing at each of four or eight possible index points). Further, as another example, high-resolution audio fingerprints could represent longer time segments than low-resolution audio fingerprints, such as with high-resolution audio fingerprints representing approximately 6 seconds of audio and low-resolution fingerprints representing approximately 3 seconds of audio. Other examples, and/or combinations of any of these examples, could be possible as well.

In an example implementation of the process described above, when the media client 102 is presenting audio, the media client 102 could work with the fingerprint-matching server 202 to identify a song being presented. For efficiency, the media client 102 may first apply a trained classifier to help determine whether the audio being presented is a song rather than being mere speech or the like. Upon determining that the audio is a song, the media client 102 may then work with the server 202 to identify the song.

As discussed above, for instance, the media client 102 could generate a number of high-resolution query fingerprints representing the audio being presented and could transmit those high-resolution query fingerprints to the server 202. As or when the server receives these high-resolution query fingerprints from the media client 102, the server 202 could then compare the high-resolution query fingerprints with the high-resolution reference fingerprints of various known songs in the reference database 302. And upon finding with sufficient certainty that the high-resolution query fingerprints match high-resolution reference fingerprints representing a particular song, the server 202 could conclude that the media client 102 is currently presenting that song. The server 202 could therefore then further obtain from the reference database 302 various metadata regarding that identified song, as well as a set of low-resolution reference fingerprints representing the identified song (e.g., representing respective segments throughout the song), and the server 202 could respond to the media client 102 with the obtained metadata and low-resolution reference fingerprints.

As the media client 102 continues to present audio, the media client 102 could respond to receipt of this information from the server 202 (i) by presenting the metadata and also (ii) by engaging in local fingerprint matching to evaluate whether the identified song continues to be played.

For the local fingerprint matching, the media client 102 could generate low-resolution query fingerprints of the audio that the media client 102 is presenting and could compare each such low-resolution query fingerprint with the set of low-resolution reference fingerprints provided by the server 202. As long as the media client 102 finds that each low-resolution query fingerprint matches a corresponding low-resolution reference fingerprint representing the identified song, the media client 102 could continue to present the received metadata. However, if and when the media client 102 thereby finds a threshold fingerprint mismatch, such as a sequence of 2 (or another designated number) of the low-resolution query fingerprints not matching any of the received low-resolution reference fingerprints, then the media client 102 could conclude that it is no longer presenting the identified song. Upon detecting such a threshold mismatch (and also possibly after applying a classifier to determine that the audio being presented is a song), the media client 102 could then work with the server 202 to newly identify the song being presented.

For this new song-identification process, the media client 102 could generate high-resolution query fingerprints as discussed above and send those high-resolution query fingerprints to the server 202. And the server 202 could likewise compare those high-resolution query fingerprints with high-resolution reference fingerprints in the reference database 302 in an effort to find a match. Once again here, if the server 202 finds that the high-resolution query fingerprints match high-resolution reference fingerprints representing a particular song, the server 202 could then obtain and provide the media client 102 with metadata regarding that song and low-resolution reference fingerprints representing that song.

As discussed above, when the media client 102 receives this information from the server 202, the media client 102 could then engage in a process to validate the song identification, as a condition precedent to the media client 102 then presenting the received metadata. Further, in this validation process, the media client 102 could conveniently make use of at least one of its mismatched low-resolution query fingerprints—namely, at least one of the low-resolution query fingerprints whose mismatching with the previously provided low-resolution reference fingerprints formed a basis for triggering the new song-identification as to which the media client 102 is now performing the validation.

In an example implementation, as the media client 102 generates low-resolution query fingerprints over time while presenting audio, the media client 102 could buffer those low-resolution query fingerprints in a circular buffer. Once the media client 102 finds a threshold mismatch that triggers the media client 102 then initiating a new song-identification process with the server 202, the media client 102 could retain one or more of the mismatched low-resolution query fingerprints and could generate and send to the server 202 a set of high-resolution query fingerprints to facilitate the new song-identification. That way, once the server 202 then sends to the media client 102 the song metadata and low-resolution reference fingerprints representing the identified song, the media client 102 could conveniently make use of one or more such mismatched low-resolution query fingerprints, possibly along with one or more additionally generated low-resolution query fingerprints, in the validation process.

The media client 102 could thus take at least one of its mismatched low-resolution query fingerprints and compare that mismatched low-resolution query fingerprint with the low-resolution reference fingerprints representing the newly identified song. If the media client 102 finds that that low-resolution query fingerprint matches a low-resolution reference fingerprint of the received set of low-resolution reference fingerprints representing the newly identified song, then, based at least in part on that finding, the media client 102 could conclude that the new song identification was correct, and so the media client 102 could then proceed to present the received metadata regarding the newly identified song. Whereas, if the media client 102 finds that the low-resolution query fingerprint does not match any low-resolution reference fingerprint of the received set of low-resolution reference fingerprints representing the newly identified song, then, based at least in part on that finding, the media client 102 could conclude that the new song identification was incorrect, and so the media client 102 could forgo presenting the received metadata regarding the newly identified song and could instead initiate new song-identification as discussed above.

As noted above, making use of at least one of the media client's previously mismatched low-resolution query fingerprints as a basis to validate a new song identification may optimally help to expedite the validation process, which may in turn provide improved user experience by facilitating quicker presentation of the song metadata.

For instance, if the validation process would require that the media client 102 find that at least one low-resolution query fingerprint matches a low-resolution reference fingerprint in the newly received set of low-resolution reference fingerprints, then the media client 102 could immediately perform that fingerprint comparison upon receiving the set of low-resolution reference fingerprints—without having to wait to first generate the low-resolution query fingerprint, since the media client 102 would already have the previously mismatched low-resolution query fingerprint to use for this purpose.

Likewise, if the validation process would require that the media client 102 find that at least two low-resolution query fingerprints (e.g., two in a row) match low-resolution reference fingerprints in the newly received set of low-resolution reference fingerprints, then the media client 102 could immediately perform that fingerprint comparison upon receiving the set of low-resolution reference fingerprints—without having to wait to first generate the low-resolution query fingerprint, since the media client 102 would already have the previously mismatched low-resolution query fingerprints to use for this purpose.

In making use of one or more previously mismatched query fingerprints as a basis to validate a new song identification, the media client 102 may additionally make use of one or more newly generated query fingerprints for this purposes as well. Namely, the media client 102 may both (i) compare at least one previously mismatched query fingerprint with the newly received reference fingerprints in an effort to find a match and (ii) generate at least one new query fingerprint representing the audio being presented, i.e., representing a portion of the audio after that represented by the previously mismatched query fingerprint, and compare that at least one new query fingerprint with the newly received reference fingerprints in an effort to find a match. And the media client 102 may base the validation conclusion on these comparisons in combination.

For instance, if the validation process would require that the media client 102 find that at least two query fingerprints match reference fingerprints of the newly received set of reference fingerprints, the media client 102 may be able to use at least one previously mismatched query fingerprint and at least one newly generated (not previously mismatched) query fingerprint for that purposes. If the media client 102 finds both that the previously mismatched query fingerprint matches a reference fingerprint in the newly received set of reference fingerprints and that the newly generated query fingerprint matches another reference fingerprint in the newly received set of reference fingerprints, then the media client 102 may conclude that the song identification is correct and may proceed to present the received metadata. Whereas, if the media client 102 finds that at least one such query fingerprint does not match any reference fingerprint in the newly received set of reference fingerprints, then the media client 102 may conclude that the song identification is not correct and may therefore forgo presenting the received metadata and may newly initiate the song-identification process.

Figure 4:
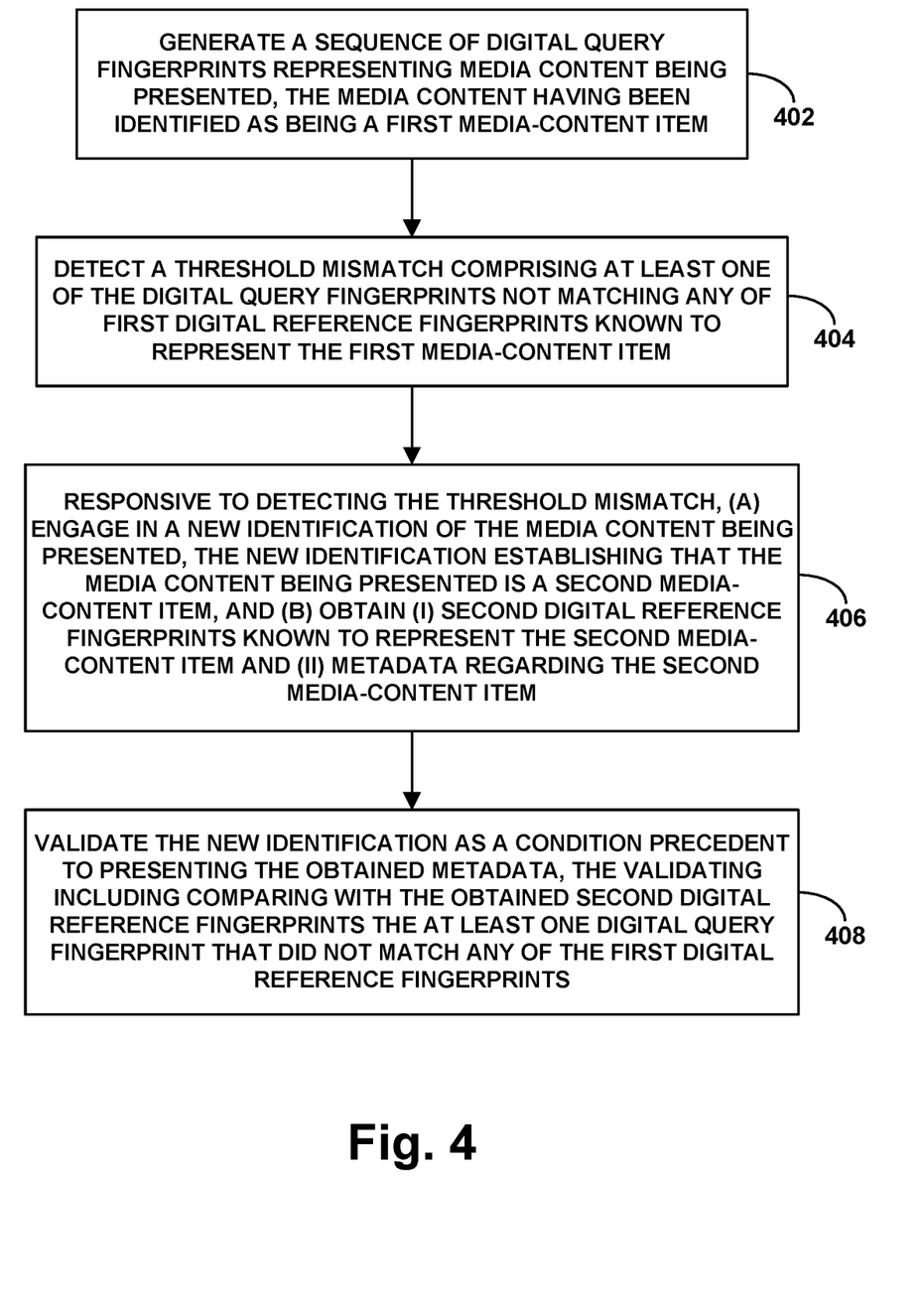
FIG. 4 is a flow chart depicting a method that could be carried out in accordance with the disclosure.

FIG. 4 is a flow chart depicting a method that could be carried out in accordance with the present disclosure, to control presentation of media-content metadata. This method could be carried out by a computing system such as that discussed above for instance, perhaps by a media client and/or by a server.

As shown in FIG. 4, at block 402, the method includes a computing system generating a sequence of digital query fingerprints representing media content being presented, the media content having been identified as being a first media-content item. At block 404, the method further includes the computing system detecting a threshold mismatch comprising at least one of the digital query fingerprints not matching any of first digital reference fingerprints known to represent the first media-content item. At block 406, the method further includes, responsive to detecting the threshold mismatch, (a) the computing system engaging in a new identification of the media content being presented, the new identification establishing that the media content being presented is a second media-content item, and (b) obtaining both second digital reference fingerprints known to represent the second media-content item and metadata regarding the second media-content item. And at block 408, the method includes the computing system validating the new identification as a condition precedent to presenting the obtained metadata, with the validating including comparing with the obtained second digital reference fingerprints the at least one digital query fingerprint that did not match any of the first digital reference fingerprints.

In line with the discussion above, the media content being presented in this method could be audio and/or video content, the digital fingerprints could therefore be audio and/or video fingerprints, and the first and second media-content items could be songs, videos, advertisements, games, or other media-content items. For instance, the media content could comprise audio content, the digital fingerprints could be audio fingerprints, and the first and second media-content items could be songs.

Further, as discussed above, the computing system could be implemented at least in part at a media client that is configured to play media content for consumption by at least one end user. And in that case, the act of generating the digital query fingerprints could involve the media client generating the digital query fingerprints, and the media content having been identified as being the first media-content item could involve a server in network communication with the media client having identified the media content as being the first media-content item.

In addition, as discussed above, the method could involve the media client receiving from the server the first digital reference fingerprints known to represent the first media-content item. And in that case, the act of the computing system detecting the threshold mismatch could involve the media client detecting, based on a comparison of the at least one digital query fingerprint with the received first digital reference fingerprints, that the at least one digital query fingerprint does not match the first digital reference fingerprints.

Further, as discussed above, the act of the computing system engaging in the new identification could involve generating and sending from the media client to the server one or more digital query fingerprints representing the media content being presented. And the act of obtaining the second digital reference fingerprints and the metadata could involve receiving by the media client from the server, in response to the media client sending to the server the one or more digital query fingerprints representing the media content being presented, the second digital reference fingerprints and the metadata.

Yet further, the act of the computing system validating the new identification as the condition precedent to presenting the obtained metadata could involve (i) the media client comparing with the obtained second digital reference fingerprints the at least one digital query fingerprint that did not match any of the first digital reference fingerprints, (ii) based at least on the comparing with the obtained second digital reference fingerprints the at least one digital query fingerprint that did not match any of the first digital reference fingerprints, the media client making a determination of whether the new identification is correct, and (iii) based on the determination of whether the new identification is correct, controlling whether to present the obtained metadata.

In addition, as discussed above, the act of controlling, based on the determination of whether the new identification is correct, whether to present the obtained metadata could involve (i) if the determination is that the new identification is correct, then presenting the obtained metadata and (ii) if the determination is that the new identification is not correct, then forgoing from presenting the obtained metadata.

As further discussed above, the new identification establishing that the media content being presented is the second media-content item could be based on fingerprint-matching using a first resolution of digital fingerprints. And in the validating, the obtained second digital reference fingerprints and the at least one digital query fingerprint that did not match any of the first digital reference fingerprints could be a second resolution of digital fingerprints lower than the first resolution.

Still further, as discussed above, the at least one digital query fingerprint that did not match any of the first digital reference fingerprints could comprise at least two digital query fingerprints that did not match any of the first digital reference fingerprints. For instance, the validation of the new identification could be done with at least two previously mismatched digital query fingerprints.

As discussed above, various described features could alternatively be implemented in a server-centric implementation or in any of various other implementations.

In addition, various operations described above could be defined by program instructions stored on one or more non-transitory computer readable media, the program instructions being executable by one or more processors to cause the one or more processors to carry out the operations (e.g., to cause the operations to be carried out). One or more such non-transitory computer readable media could be provided, integrated, or otherwise implemented at a media client, server, and/or other entity.

Exemplary embodiments have been described above. Those skilled in the art will understand, however, that changes and modifications may be made to these embodiments without departing from the true scope and spirit of the invention.

What is claimed is:

1. A method for controlling presentation of media-content metadata, the method comprising:
generating by a computing system a sequence of digital query fingerprints representing a particular media content item being presented by the computing system;
engaging by the computing system in an identification of the particular media content item as being a first media-content item based on matching one or more of the sequence of digital query fingerprints with one or more digital reference fingerprints of a first plurality of reference fingerprints, wherein the first plurality of digital reference fingerprints is known to represent the first media-content item;
detecting by the computing system, while the particular media content item is being presented by the computing system, a set of mismatches, wherein the set of mismatches includes a number of mismatches, wherein each mismatch in the set of mismatches comprises one of the sequence of digital query fingerprints not matching any of the first plurality of digital reference fingerprints known to represent the first media-content item, wherein the number of mismatches is at least one;
determining that the number of mismatches exceeds a threshold number;
responsive to determining that the number of mismatches exceeds the threshold number and while the particular media content item is being presented by the computing system, (a) engaging by the computing system in a new identification of the particular media content item being presented by the computing system, the new identification establishing that the particular media content item being presented is a second media-content item, and (b) obtaining (i) a second plurality of digital reference fingerprints known to represent the second media-content item and (ii) metadata regarding the second media-content item; and
validating by the computing system the new identification as a condition precedent to the computing system presenting the obtained metadata, wherein the validating comprises comparing with the obtained second plurality of digital reference fingerprints the digital query fingerprints for each mismatch in the set of mismatches, wherein the new identification establishing that the particular media content item being presented is the second media-content item is based on fingerprint-matching using a first resolution of digital fingerprints, wherein, in the validating, the obtained second plurality of digital reference fingerprints and the digital query fingerprints in the set of mismatches are both a second resolution of digital fingerprints lower than the first resolution.

2. The method of claim 1, wherein the particular media content item being presented by the computing system comprises audio content, and wherein the first and second media-content items are songs.

3. The method of claim 1, wherein the computing system is implemented at least in part at a media client configured to play the particular media content item for consumption by at least one end user, and wherein generating the digital query fingerprints comprises the media client generating the digital query fingerprints.

4. The method of claim 3, wherein engaging in the identification of the particular media content item as being the first media-content item comprises a server in network communication with the media client matching the one or more of the sequence of digital query fingerprints with the one or more digital reference fingerprints.

5. The method of claim 4, further comprising the media client receiving from the server the first plurality of digital reference fingerprints known to represent the first media-content item, wherein detecting by the computing system a mismatch of the set of mismatches comprises the media client detecting, based on a comparison of one of the sequence of digital query fingerprints with the received first plurality of digital reference fingerprints, that the one of the sequence of digital query fingerprints does not match the first plurality of digital reference fingerprints.

6. The method of claim 4,
wherein engaging by the computing system in the new identification comprises generating and sending from the media client to the server one or more digital query fingerprints representing the particular media content item being presented, and
wherein obtaining the second plurality of digital reference fingerprints and the metadata comprises receiving by the media client from the server, in response to the media client sending to the server the one or more digital query fingerprints representing the particular media content item being presented, the second plurality of digital reference fingerprints and the metadata.

7. The method of claim 4, wherein validating by the computing system the new identification as the condition precedent to the computing system presenting the obtained metadata comprises:
the media client comparing with the obtained second plurality of digital reference fingerprints the digital query fingerprints in the set of mismatches;
based at least on the comparing with the obtained second plurality of digital reference fingerprints the digital query fingerprints in the set of mismatches, making a determination by the media client of whether the new identification is correct; and
based on the determination of whether the new identification is correct, controlling whether to present the obtained metadata.

8. The method of claim 7, wherein controlling, based on the determination of whether the new identification is correct, whether to present the obtained metadata comprises:
if the determination is that the new identification is correct, then presenting the obtained metadata; and
if the determination is that the new identification is not correct, then forgoing from presenting the obtained metadata.

9. The method of claim 1, wherein the threshold number is one and the number of mismatches is at least two.

10. A computing system comprising:
at least one processor;
at least one non-transitory data storage;
program instructions stored in the at least one non-transitory data storage and executable by the at least one processor to carry out operations for controlling presentation of media-content metadata, the operations comprising:
generating a sequence of digital query fingerprints representing a particular media content item being presented;
engaging by the computing system in an identification of the particular media content item as being a first media-content item based on matching one or more of the sequence of digital query fingerprints with one or more digital reference fingerprints of a first plurality of reference fingerprints, wherein the first plurality of digital reference fingerprints is known to represent the first media-content item,
detecting, while the particular media content item is being presented, a set of mismatches, wherein the set of mismatches includes a number of mismatches, wherein each mismatch in the set of mismatches comprises one of the sequence of digital query fingerprints not matching any of the first plurality of digital reference fingerprints known to represent the first media-content item, wherein the number of mismatches is at least one,
determining that the number of mismatches exceeds a threshold number,
responsive to determining that the number of mismatches exceeds the threshold number and while the particular media content item is being presented, (a) engaging in a new identification of the particular media content item being presented, the new identification establishing that the particular media content item being presented is a second media-content item, and (b) obtaining (i) a second plurality of digital reference fingerprints known to represent the second media-content item and (ii) metadata regarding the second media-content item, and
validating the new identification as a condition precedent to presenting the obtained metadata, wherein the validating comprises comparing with the obtained second plurality of digital reference fingerprints the digital query fingerprints for each mismatch in the set of mismatches, wherein the new identification establishing that the particular media content item being presented is the second media-content item is based on fingerprint-matching using a first resolution of digital fingerprints, wherein, in the validating, the obtained second plurality of digital reference fingerprints and the digital query fingerprints in the set of mismatches are both a second resolution of digital fingerprints lower than the first resolution.

11. The computing system of claim 10, wherein the particular media content item being presented comprises audio content, and wherein the first and second media-content items are songs.

12. The computing system of claim 10, wherein the computing system is implemented at least in part at a media client configured to play the particular media content item for consumption by at least one end user, and wherein generating the digital query fingerprints comprises the media client generating the digital query fingerprints.

13. The computing system of claim 12, wherein engaging in the identification of the particular media content item as being the first media-content item comprises a server in network communication with the media client matching the one or more of the sequence of digital query fingerprints with the one or more digital reference fingerprints.

14. The computing system of claim 13, wherein the operations further comprise:
the media client receiving from the server the first plurality of digital reference fingerprints known to represent the first media-content item, wherein detecting a mismatch of the set of mismatches comprises the media client detecting, based on a comparison of one of the sequence of digital query fingerprints with the received first plurality of digital reference fingerprints, that the one of the sequence of digital query fingerprints does not match the first plurality of digital reference fingerprints.

15. The computing system of claim 13,
wherein engaging in the new identification comprises generating and sending from the media client to the server one or more digital query fingerprints representing the particular media content item being presented, and
wherein obtaining the second plurality of digital reference fingerprints and the metadata comprises receiving by the media client from the server, in response to the media client sending to the server the one or more digital query fingerprints representing the particular media content item being presented, the second plurality of digital reference fingerprints and the metadata.

16. The computing system of claim 13, wherein validating the new identification as the condition precedent to presenting the obtained metadata comprises:
the media client comparing with the obtained second plurality of digital reference fingerprints the digital query fingerprints in the set of mismatches;
based at least on the comparing with the obtained second plurality of digital reference fingerprints the digital query fingerprints in the set of mismatches, making a determination by the media client of whether the new identification is correct; and
based on the determination of whether the new identification is correct, controlling whether to present the obtained metadata.

17. The computing system of claim 16, wherein controlling, based on the determination of whether the new identification is correct, whether to present the obtained metadata comprises:
if the determination is that the new identification is correct, then presenting the obtained metadata; and
if the determination is that the new identification is not correct, then forgoing from presenting the obtained metadata.

18. At least one non-transitory computer-readable medium having stored thereon program instructions executable by at least one processor to carry out operations for controlling presentation of media-content metadata, the operations comprising:
generating a sequence of digital query fingerprints representing a particular media content item being presented;
engaging by the computing system in an identification of the particular media content item as being a first media-content item based on matching one or more of the sequence of digital query fingerprints with one or more digital reference fingerprints of a first plurality of reference fingerprints, wherein the first plurality of digital reference fingerprints is known to represent the first media-content item,
detecting, while the particular media content item is being presented, a set of mismatches, wherein the set of mismatches includes a number of mismatches, wherein each mismatch in the set of mismatches comprises one of the sequence of digital query fingerprints not matching any of the first plurality of digital reference fingerprints known to represent the first media-content item, wherein the number of mismatches is at least one,
determining that the number of mismatches exceeds a threshold number,
responsive to determining that the number of mismatches exceeds the threshold number and while the particular media content item is being presented, (a) engaging in a new identification of the particular media content item being presented, the new identification establishing that the particular media content item being presented is a second media-content item, and (b) obtaining (i) a second plurality of digital reference fingerprints known to represent the second media-content item and (ii) metadata regarding the second media-content item, and
validating the new identification as a condition precedent to presenting the obtained metadata, wherein the validating comprises comparing with the obtained second plurality of digital reference fingerprints the digital query fingerprints for each mismatch in the set of mismatches, wherein the new identification establishing that the particular media content item being presented is the second media-content item is based on fingerprint-matching using a first resolution of digital fingerprints, wherein, in the validating, the obtained second plurality of digital reference fingerprints and the digital query fingerprints in the set of mismatches are both a second resolution of digital fingerprints lower than the first resolution.

\* \* \* \* \*